(12) United States Patent
Caldwell

(10) Patent No.: US 7,611,325 B2
(45) Date of Patent: Nov. 3, 2009

(54) WIND COLLECTOR

(76) Inventor: Dennis P. Caldwell, 3 Altamira St., Borger, TX (US) 79007

( * ) Notice: Subject to any disclaimer, the term of this patent is extended or adjusted under 35 U.S.C. 154(b) by 0 days.

(21) Appl. No.: 11/902,810

(22) Filed: Sep. 26, 2007

(65) Prior Publication Data

US 2009/0081023 A1 Mar. 26, 2009

(51) Int. Cl.
*F03D 11/00* (2006.01)
(52) U.S. Cl. .................................. 415/4.1; 415/909
(58) Field of Classification Search ................ 415/2.1, 415/4.1, 909, 3.1, 906, 146, 147
See application file for complete search history.

(56) References Cited

U.S. PATENT DOCUMENTS

| | | | | |
|---|---|---|---|---|
| 4,491 | A | * | 5/1846 | Judd ........................ 415/149.1 |
| 232,558 | A | | 9/1880 | Smith |
| 683,935 | A | | 10/1901 | Hensel |
| 1,513,874 | A | * | 11/1924 | Ufford ........................ 415/147 |
| 4,141,670 | A | * | 2/1979 | Russell ....................... 415/3.1 |
| 4,189,647 | A | * | 2/1980 | Wittig ......................... 290/42 |
| 4,421,452 | A | * | 12/1983 | Rougemont ................. 415/4.2 |
| 4,486,143 | A | | 12/1984 | McVey |
| 4,551,631 | A | | 11/1985 | Trigilio |
| 4,834,610 | A | | 5/1989 | Bond, III |
| 6,710,469 | B2 | | 3/2004 | McDavid, Jr. |
| 7,242,108 | B1 | | 7/2007 | Dablo |

FOREIGN PATENT DOCUMENTS

JP 56113068 A * 9/1981
JP 05079448 A * 3/1993

OTHER PUBLICATIONS

Japanese Patent Office (JPO) Machine Translation of JP 05-79448. pp. 1-2.*

* cited by examiner

*Primary Examiner*—Richard Edgar
(74) *Attorney, Agent, or Firm*—Stephen R. Greiner

(57) ABSTRACT

A wind collector including a number of upright columns being arranged in a closed geometric form. A roof is affixed to the tops of the columns. A number of horizontal beams connect each adjacent pair of columns together beneath the roof. Each of the beams has an inner surface and an opposed, outer surface. A plurality of movable panels is suspended from the horizontal beams. Each of the panels is hingedly connected, at the top thereof, to one of the beams and, at the bottom thereof, normally contacts and presses downwardly upon the inner surface of another one of the beams whereby passing winds swing the bottoms of the panels inwardly and enter the wind collector.

2 Claims, 5 Drawing Sheets

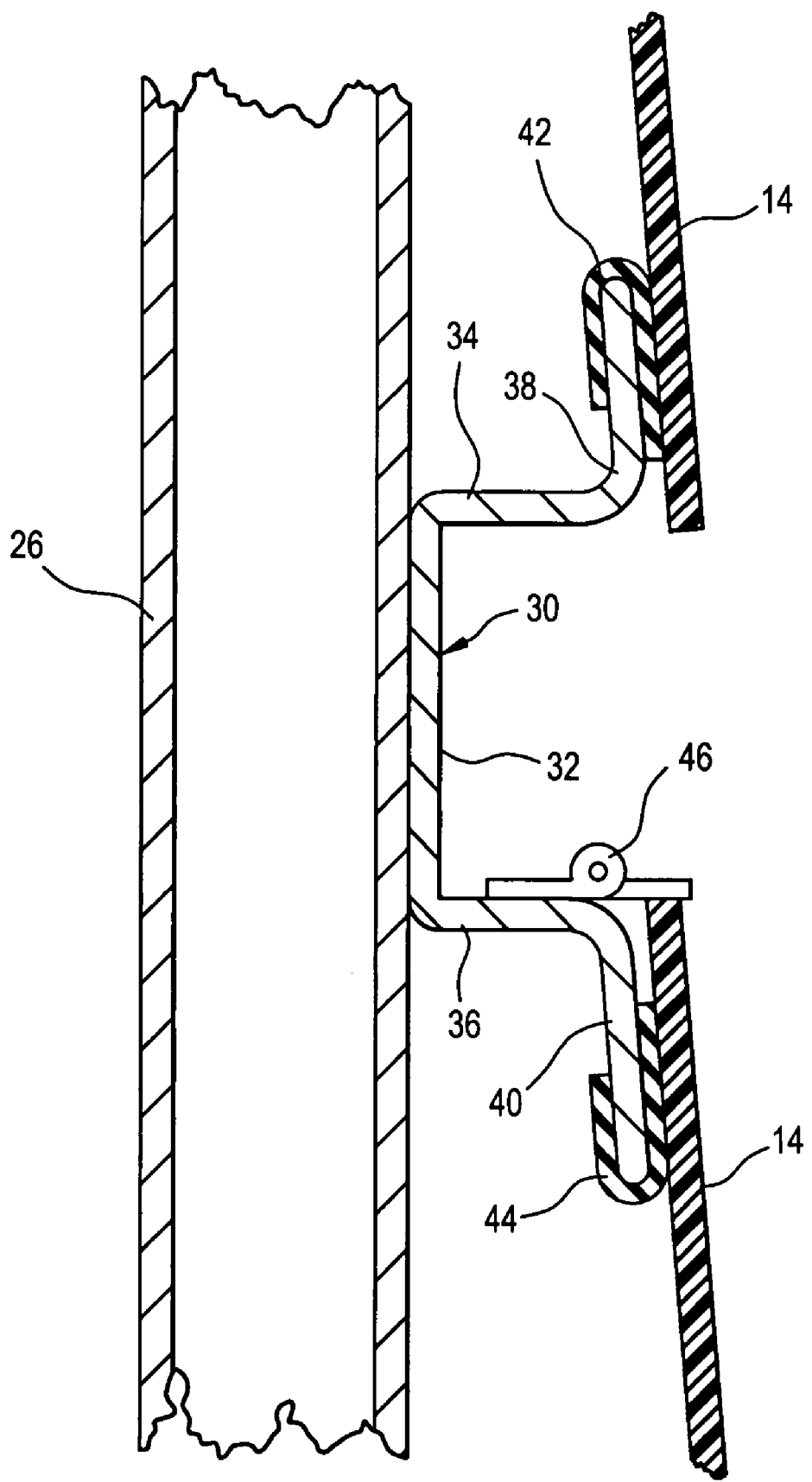

WIND COLLECTOR

FIELD OF THE INVENTION

The present invention relates generally to rotary kinetic fluid motors or pumps with flow guiding means in response to natural fluid current force or direction.

BACKGROUND OF THE INVENTION

The efficiency of a wind turbine can be significantly reduced if it is mounted either too low or too high above the ground. In some areas, winds tend to have a greater velocity at higher altitudes while in other areas winds tend to have a greater velocity at lower altitudes. So, thoughtful engineers position turbines at heights where average, long term, wind velocities are greatest, all other design factors being considered equal.

Regardless of long term trends, from day to day, and in some cases from hour to hour, the relative velocities of winds vary at different heights above the ground. For example, during the morning, near-surface winds are strongest at some locations whereas winds well above the ground are strongest during the evening. A turbine positioned at a fixed elevation cannot benefit from these fluctuations and, in fact, is impeded by them.

SUMMARY OF THE INVENTION

In light of the problems associated with the known wind turbines, it is a principal object of the invention to provide a wind collector capable of gathering winds at a range of heights above the ground and funneling such to one or more turbines to accomplish useful work. The wind collector, then, extends upwardly from the ground, or other supporting surface, to divert winds downwardly to one or more turbines or wind-driven machines, like water pumps, positioned adjacent the wind collector.

It is another object of the invention to provide a wind collector of the type described that features a plurality of movable panels that open to admit wind only on the upwind side(s) of the collector. Only the panels facing winds, producing a pressure that is greater than that of the air within the collector, will open. Thus, strong winds striking the top of the collector will open the panels at the top of the collector thereby preventing high-pressure air from escaping the collector at the bottom thereof. In any case, all movable panels positioned on the downwind side of the collector remain closed and sealed.

It is an object of the invention to provide improved features and arrangements thereof in a wind collector for the purposes described that is relatively lightweight in construction, inexpensive to manufacture, and dependable in use.

Briefly, the wind collector in accordance with this invention achieves the intended objects by featuring a number of upright columns arranged in a closed geometric form like a square. A roof is affixed atop the columns. A number of horizontal beams connect adjacent pairs of columns together. A number of movable panels are suspended from the horizontal beams. Each of the panels is hingedly connected, at the top thereof, to one of the beams and, at the bottom thereof, normally contacts and presses downwardly upon the inner surface of another one of the beams whereby passing winds swing the bottoms of the panels inwardly to enter the wind collector.

The foregoing and other objects, features, and advantages of the wind collector will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 5 is an enlarged view of the circled portion, labeled with the numeral 5, of FIG. 4.

Similar reference characters denote corresponding features consistently throughout the accompanying drawings.

DETAILED DESCRIPTION OF THE WIND COLLECTOR

Figure 1:
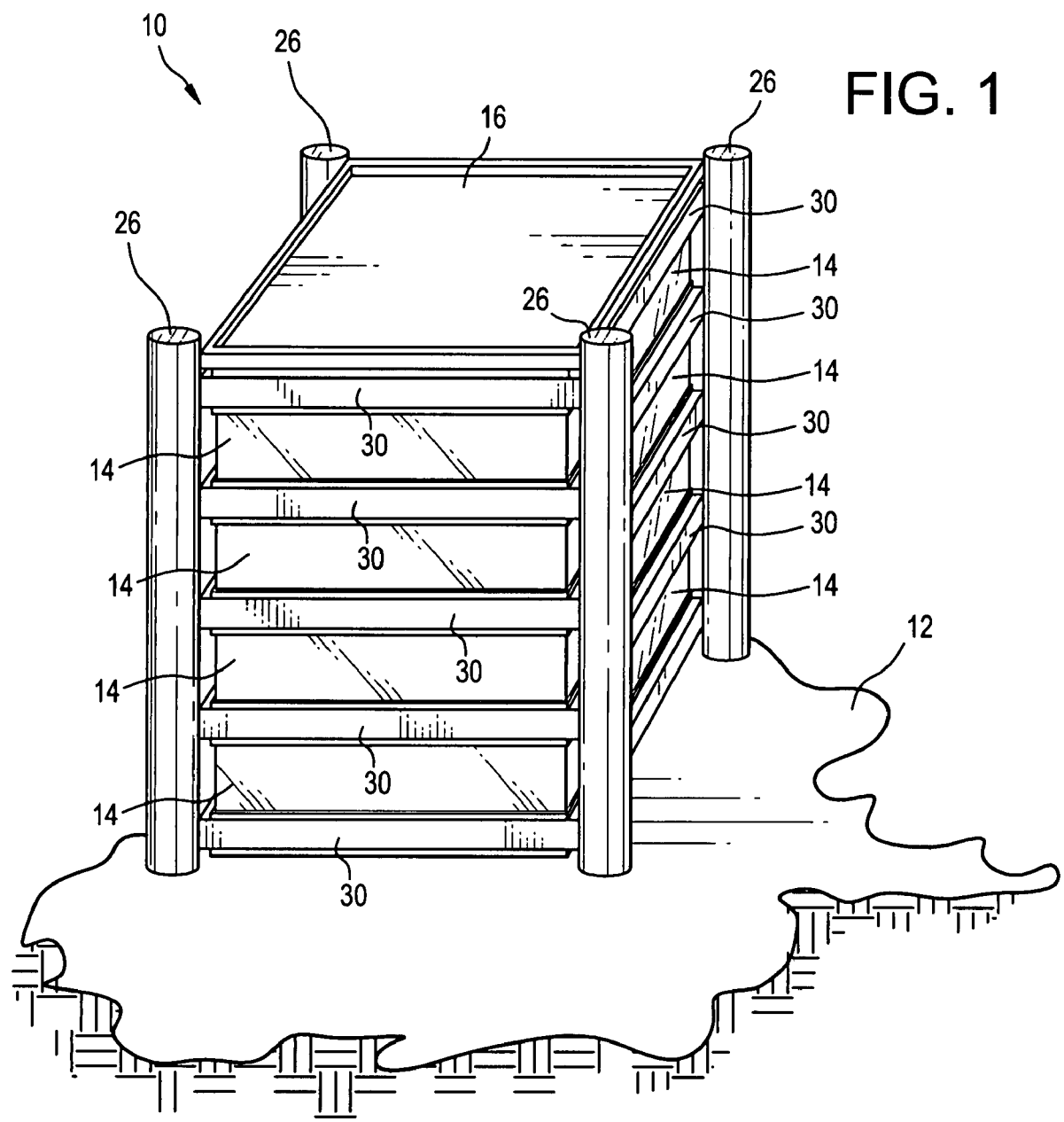
FIG. 1 is a perspective view of a wind collector in accordance with the present invention.

Referring now to the FIGS., a wind collector in accordance with the present invention is shown at 10. Collector 10 extends upwardly from a solid foundation 12 and has a polygonal cross section. Each side of collector 10 is fitted with a set of movable panels 14 that swings open when struck by a wind W thereby permitting a flow of air into collector 10. Sets of panels 14 on the downwind side of collector 10 remain closed as air flows into collector 10 through the open, upwind panels 14. A roof 16 closes the top of collector 10. The bottom of collector 10 is connected to a conduit 18 that provides an outlet for the air entering collector 10. A turbine 20 is positioned in conduit 18 and rotates in the passing air flow. Turbine 20 is connected to a generator 22 capable of producing an electrical current for powering electrical devices such as light bulb 24.

Wind collector 10 includes a number of upright columns 26, one being positioned at each corner thereof and being affixed, as with threaded fasteners 28, to foundation 12. Four columns 26 are employed in collector 10 but their number is a matter of design choice that could range upwardly from three depending upon the number of directions that a user desires that panels 14 face. (In areas where prevailing winds are highly variable in their direction, wind collectors with more sides are preferable, whereas wind collectors positioned in areas where prevailing winds are steady may require fewer sides.) Depending on the volumes of air that collector 10 is designed to admit, columns 26 can be spaced a few feet to tens of feet apart and made several feet to several hundred feet in height. Of course, the cross-sectional configuration of columns 26 is shown to be circular, but can be made any shape and size, and from any suitable material, sufficient to withstand expected wind loads.

Adjacent columns 26 are connected together by horizontal beams 30. Beams 30 are evenly spaced from one another and are located at spaced-apart positions from the bottoms of columns 26 to the tops thereof. Beams 30 are affixed to columns 26 by any suitable means such as by penetrating fasteners or by welding.

Each of beams 30 has a front wall 32 that, with its opposite ends, abuts a pair of columns 26. A top wall 34 is affixed to, and extends inwardly from, the top of front wall 32. A bottom wall 36 is affixed to, and extends inwardly from, the bottom of front wall 32. For added rigidity, a top flange 38 is affixed to, and extends upwardly from, the inward end of top wall 34. A bottom flange 40, similarly is affixed to, and extends downwardly from, the inward end of bottom wall 36.

Top wall 34 is somewhat wider than bottom wall 36 thereby permitting top wall 34 to project inwardly into collector 10 farther than bottom wall 36. From its connection to a top wall 34, each top flange 38 (except that of the uppermost beams 30) slopes upwardly and outwardly at an angle toward the bottom flange 40 of the beam 30 positioned immediately above. Also, each bottom flange 40 (except that of the lowermost beams 30) slopes downwardly and inwardly at an angle toward the top flange 38 immediately below.

A pair of elastomeric strips 42 and 44 is affixed to each beam 30. As shown, elastomeric strip 42 covers top flange 38 from one end thereof to the other end thereof. Likewise, elastomeric strip 44 covers bottom flange 40 from one end thereof to the other end thereof. Elastomeric strips 42 and 44 serve as lengthwise seals for flanges 38 and 40, respectively.

Movable panels 14 are suspended from all beams 30 except the lowermost ones. Each movable panel 14 is attached by means of a hinge 46 to a bottom flange 40 above strip 44 and hangs downwardly therefrom. Each panel 14 extends the length of the beam 30 from which it is suspended and has a height sufficient to permit it to engage the elastomeric strip 42 covering the top flange 38 of the beam 30 immediately below. Because of the difference in widths between top wall 34 and bottom wall 36, the bottom of each panel 14 will normally press outwardly and downwardly on an elastomeric strip 42 in still air with gravity ensuring a good seal against dust and animal invaders.

Panels 14 are made of a lightweight material, such as plastic, and swing inwardly on hinges 46 when struck by wind. The configuration of beams 30 and panels 14 ensures that panels 14 cannot swing outwardly. Thus, winds striking collector 10 from a particular direction will cause panels 14 facing the winds to open. Panels 14 that do not face the winds will remain closed at all times.

Roof 16 is supported by, and is affixed to, columns 26 above beams 30. Roof 16 sheds precipitation, dust and dirt so as to prevent panels 14 and conduit 18 from becoming fouled. Further, roof 16 prevents the escape of moving air that has entered collector 10 and directs such air downwardly.

Figure 2:
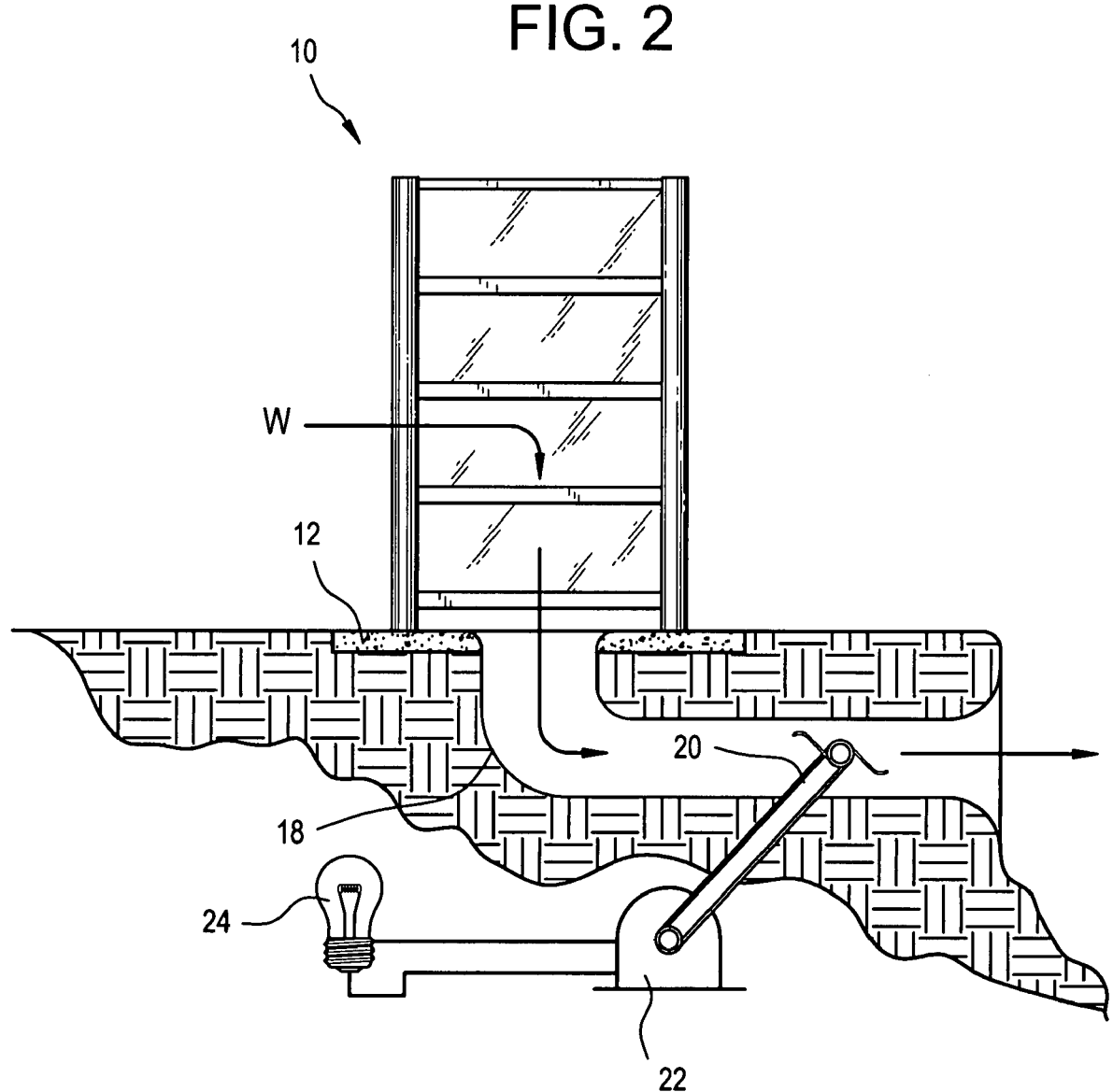
FIG. 2 is a diagrammatic view of the wind collector shown being deployed as part of an electrical generation system.
Figure 3:
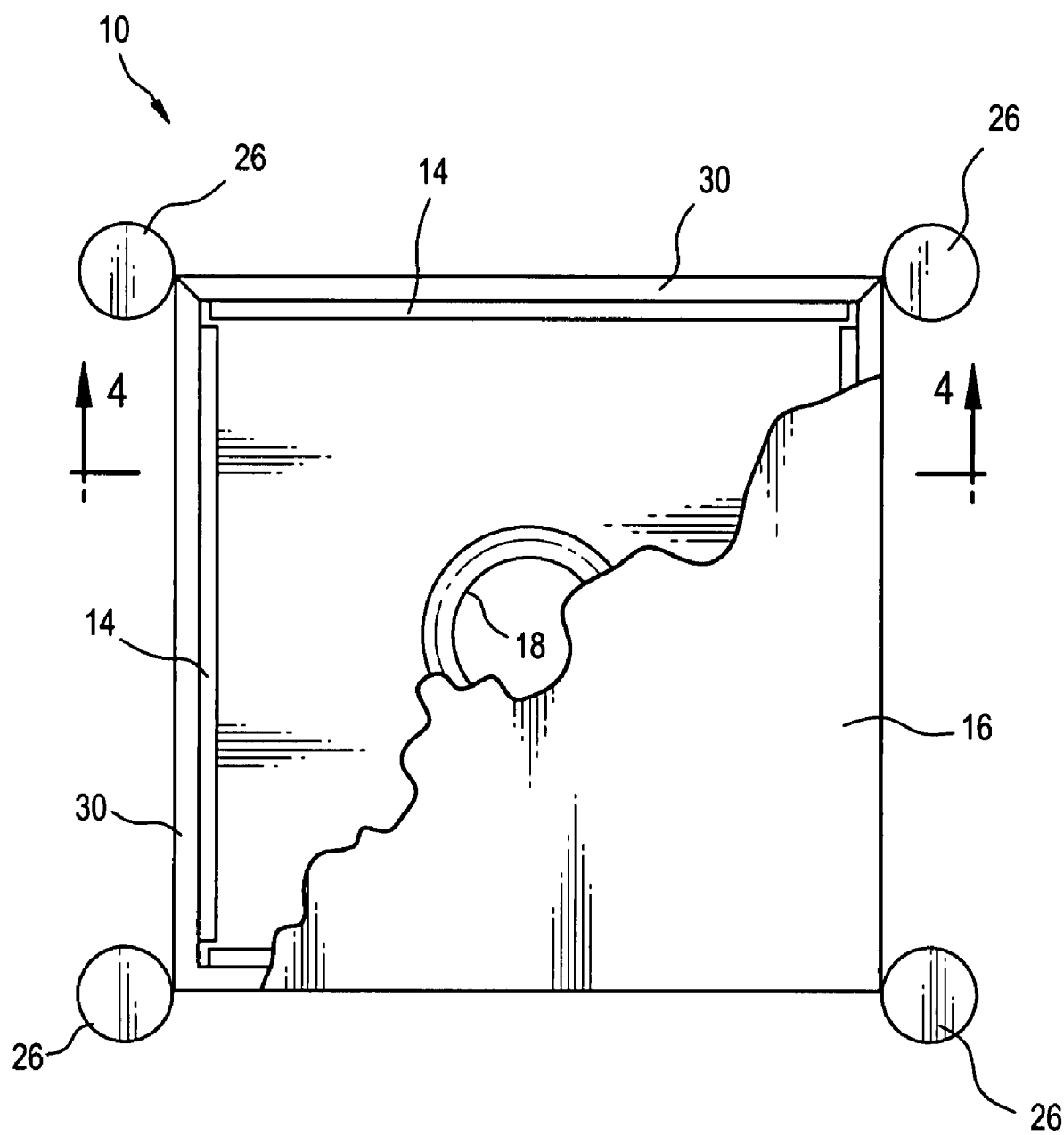
FIG. 3 is a top view of the wind collector with portions being broken away to reveal details thereof.
Figure 4:
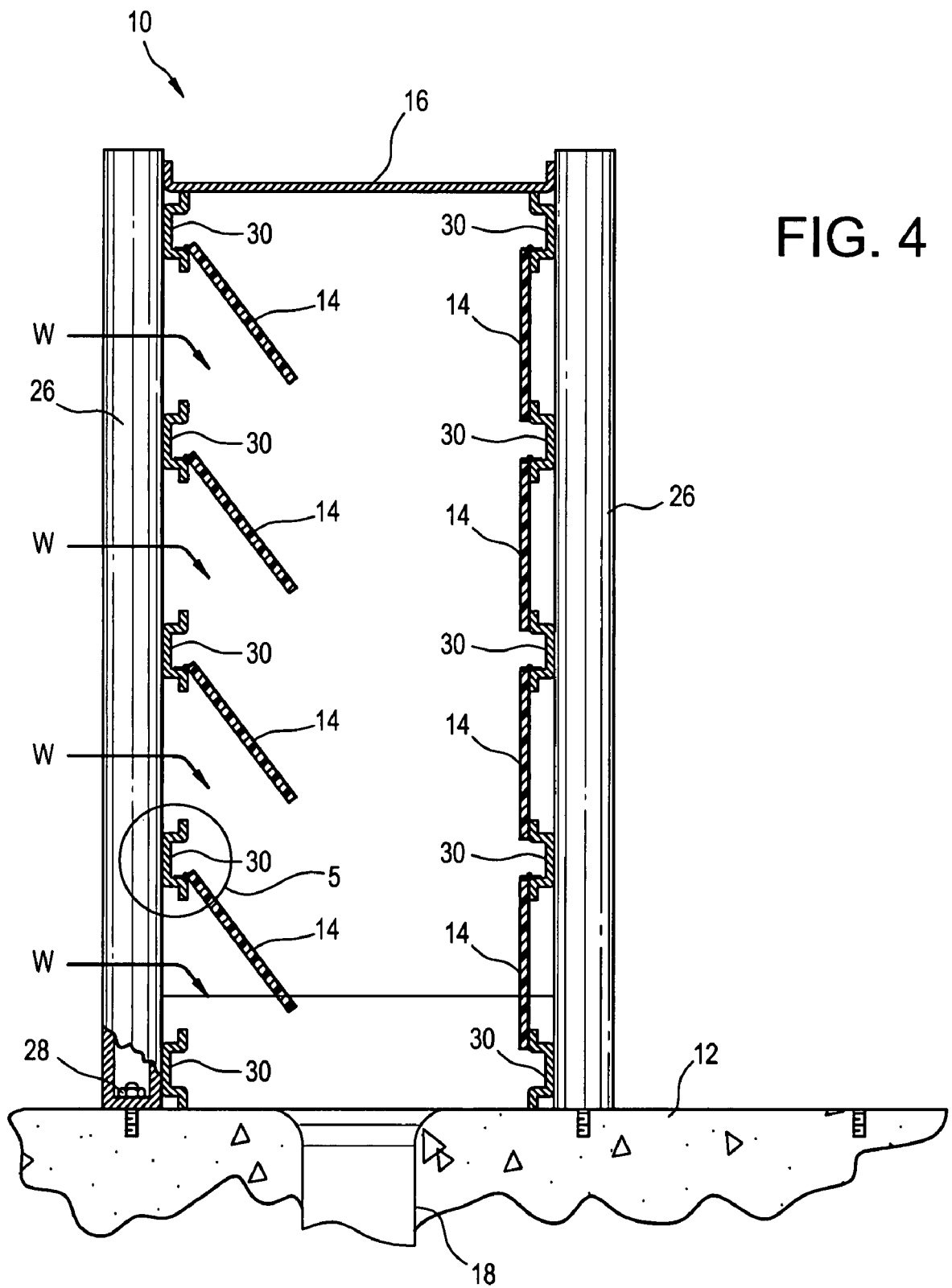
FIG. 4 is a cross-sectional view of the wind collector taken along line 4-4 of FIG. 1.

The operation of wind collector 10 is straightforward. As is shown in FIG. 2, blowing air that enters collector 10 flows to an area of low pressure, namely conduit 18. Conduit 18 has an inlet opening that penetrates foundation 12 at the center of columns 26 and an outlet opening remote from columns 26. Positioned in conduit 18 is a turbine 20 that is rotated by air moving from collector 10 and through conduit 18. Turbine 20 is operatively connected to an electrical generator 22 that can produce an electrical current sufficient to power devices like light bulb 24 through an electrical grid. Thus, when winds blow past collector 10, moving air, in sufficient volumes and velocities, is diverted through conduit 18 to turbine 20 to do useful work.

While wind collector 10 has been described with a high degree of particularity, it will be appreciated by those skilled in the art that modifications may be made to it. For example, collector 10 can be mounted atop a building rather than a cement foundation to serve as an air intake of a ventilation system rather than part of an electrical power producing mechanism. Further, wind collector 10 deliver air under pressure to underground caverns, reservoirs, and pipelines for later withdrawal to generate electricity. Therefore, it is to be understood that the present invention is not limited to wind collector described above, but encompasses any and all wind collectors within the scope of the following claims.

I claim:

1. A wind collector, comprising:
   at least three upright columns being arranged in a closed geometric form;
   a roof being affixed to the tops of said columns;
   a plurality horizontal beams connecting each adjacent pair of said columns together beneath said roof, each of said beams having an inner surface and an opposed, outer surface, each of said beams also including:
      a front wall abutting a pair of said columns;
      a top wall being affixed to, and extending inwardly from, the top of said front wall;
      a bottom wall being affixed to, and extending inwardly from, the bottom of said front wall, and said bottom wall being narrower than said top wall;
      a top flange being affixed to, and extending upwardly from, said top wall; and,
      a bottom flange being affixed to, and extending downwardly from, said bottom wall; and,
   a plurality of movable panels being suspended from said horizontal beams, each of said panels being hingedly connected, at the top thereof, to one of said beams and, at the bottom thereof, normally contacting and pressing downwardly upon said inner surface of another one of said beams whereby passing winds can swing the bottom of said panels inwardly and enter said wind collector past said panels.

2. The wind collector according to claim 1 further comprising a plurality of elastomeric strips each of which being affixed to respective one of said top flanges for providing a seal with a respective one of said movable panels.

* * * * *